United States Patent
Ono et al.

(10) Patent No.: US 6,922,013 B2
(45) Date of Patent: Jul. 26, 2005

(54) HIGH VOIDAGE PHOSPHOR LAYER AND VACUUM UV EXCITED LIGHT EMITTING ELEMENT

(75) Inventors: Keiji Ono, Tsukuba (JP); Susumu Miyazaki, Kitasoma-gun (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/002,201

(22) Filed: Dec. 5, 2001

(65) Prior Publication Data

US 2003/0146687 A1 Aug. 7, 2003

(30) Foreign Application Priority Data

Dec. 13, 2000 (JP) .......................... 2000-378669

(51) Int. Cl.[7] .................................. H01J 1/62
(52) U.S. Cl. ................... 313/486; 252/301 R
(58) Field of Search .............. 313/582–587; 345/60; 252/301.4 R

(56) References Cited

U.S. PATENT DOCUMENTS 6,106,992 A   8/2000  Asano et al.
6,565,771 B1 * 5/2003  Ono et al. ............. 252/301.4 R
6,603,448 B2 * 8/2003  Kado et al. .................... 345/60

FOREIGN PATENT DOCUMENTS

| JP | 02006589   | 1/1990 |
| JP | 08129987   | 5/1996 |
| JP | 10-142781 A | 5/1998 |
| JP | 2000-243302 A | 9/2000 |
| JP | 2000243302 | 9/2000 |
| JP | 2001266757 A | 9/2001 |

OTHER PUBLICATIONS

XP002258706, DATABASE WPI, Section Ch, Week 200235.

* cited by examiner

Primary Examiner—Joseph Williams
(74) Attorney, Agent, or Firm—Sughrue Mion, PLLC

(57) ABSTRACT

A phosphor layer having a high luminance, and a vacuum ultra-violet radiation excited light emitting element are provided. A phosphor layer having a voidage of not less than 60 vol %, the phosphor layer in which a phosphor having a BET specific surface area of not less than 3 $m^2/g$ is used, and a vacuum ultra-violet radiation excited light emitting element are provided.

5 Claims, No Drawings

HIGH VOIDAGE PHOSPHOR LAYER AND VACUUM UV EXCITED LIGHT EMITTING ELEMENT

FIELD OF THE INVENTION

The present invention relates to a phosphor layer, and particularly relates to a phosphor layer used in a vacuum ultra-violet radiation excited light emitting element that emits light when exited by vacuum ultra-violet radiation. More specifically, it relates to a phosphor layer used in a plasma display panel (hereinafter abbreviated as "PDP") as a flat panel display having a large screen, or used in a rare gas lamp.

BACKGROUND OF THE INVENTION

A phosphor layer is widely used in lamps such as rare gas lamps and fluorescent lamps, and light emitting elements for displays such as PDPs. Among these, rare gas lamps and PDPs are vacuum ultra-violet radiation excited light emitting elements, which are elements that emit light when phosphor layers are irradiated with vacuum ultra-violet rays.

In a PDP, the phosphor layer is produced by applying a phosphor paste on surfaces of a back plate or a baffle by screen printing, direct spraying utilizing a nozzle (dispense method), or the like, followed by drying and baking.

Generally, a PDP has a configuration as described in JP 10(1998)-142781A. Two glass substrates are provided in parallel facing each other, between which interposed are a multiplicity of discharge spaces (hereinafter referred to as "cells") which are divided by baffles and in which rare gas composed of Ne or Xe as a principal component is capsulated. Among the two glass substrates, one glass plate on the observer side of the PDP is a front plate, and the other glass plate is a back plate. On a back side of the front plate, electrodes are provided, which are covered with a dielectric layer. On the dielectric layer, a protective film (MgO layer) is formed. On a front side of the glass substrate as the back plate, address electrodes are formed so as to cross the electrodes provided on the front plate as described above. Further, a phosphor layer is provided so as to cover a surface of the back plate (corresponding to bottom surfaces of the cells) and surfaces of the baffles. With vacuum ultra-violet rays generated by applying an alternating voltage across electrodes, the phosphor layer is caused to emit light, so that the observer views visible rays that transmit the front plate.

An example of the vacuum ultra-violet radiation excited light emitting element other than the PDP is a rare gas lamp as an illuminating lamp. The rare gas lamp has a configuration similar to the PDP except that the discharge space is not divided by a multiplicity of baffles in many cases. The rare gas lamp attracts attentions from the viewpoint of environment preservation since it does not use mercury, unlike the fluorescent lamp.

The conventional vacuum ultra-violet radiation excited light emitting element such as a PDP or a rare gas lamp does not have a sufficient luminescence, and a vacuum ultra-violet radiation excited light emitting element having a higher luminance and a phosphor layer having a higher luminance for use therein are desired.

An object of the present inventions to provide a phosphor layer having a high luminance and a vacuum ultra-violet radiation excited light emitting element utilizing the same.

SUMMARY OF THE INVENTION

In such a situation, the inventors of the present invention have made earnest studies to solve the aforementioned problems. As a result, they focused attention on the voidage of the phosphor layer, and discovered that the phosphor layer having a voidage exceeding a certain level has a high luminance, and finally completed the present invention.

More specifically, the present invention provides a phosphor layer having a voidage of not less than 60 vol % and comprising a phosphor having a BET specific surface area of not less than 3 $m^2/g$. Furthermore, the present invention provides a vacuum ultra-violet radiation excited light emitting element, utilizing the above-described phosphor layer. Furthermore the present invention provides the foregoing vacuum ultra-violet radiation excited light emitting element that is a plasma display panel.

DETAILED DESCRIPTION OF THE INVENTION

The following description will depict the present invention in more detail.

Conventionally, it is considered that a phosphor layer having a high luminance is obtained by increasing the density of phosphor particles in the phosphor layer as much as possible so as to make the phosphor layer dense with a small voidage. However, the inventors of the present invention unexpectedly found that a non-dense phosphor layer having a great voidage has a high luminance.

A phosphor layer of the present invention has a voidage of not less than 60 vol % More preferably, it has a voidage of not less than 65 vol %. In the case where the voidage is less than 60 vol %, the emission luminance of the phosphor layer may decrease. In the case where the voidage is excessively high, the density of the phosphor particles decreases, and decreasing the emission luminance of the phosphor layer may occur. Therefore, the voidage is preferably not more than 95 vol %, and more preferably not more than 90 vol %.

A phosphor having a BET specific surface area of not less than 3 $m^2/g$ are used for forming the phospor layer of the present invention. More preferably, a BET specific surface area of not less than 5 $m^2/g$ may be preferable from the viewpoint of a high voidage of the phosphor layer. In the case where the BET specific surface area decreases, it may be difficult to obtain a high voidage.

An example of the method forming the phosphor layer utilizing a phosphor is screen printing utilizing a phosphor paste.

Any known binder resin can be used as a binder resin used in the phosphor paste that is used when a phosphor layer is formed. Examples of the binder resin include ethyl cellulose, methyl cellulose, nitro cellulose, acetyl cellulose, acetyl ethyl cellulose, cellulose propionate, hydroxypropyl cellulose, butyl cellulose, benzyl cellulose, etc.

Examples of an organic solvent used in the phosphor paste include diethylene glycol monomethyl ether, diethylene glycol monoethyl ether, diethylene glycol monobutyl ether, diethylene glycol monomethyl ether acetate, diethylene glycol monoethyl ether acetate, ethylene glycol monomethyl ether acetate, ethylene glycol monobutyl ether acetate, propylene glycol monobutyl ether, dipropylene glycol, dipropylene glycol monomethyl ether, dipropylene glycol monoethyl ether, dipropylene glycol monomethyl ether acetate, propylene glycol monomethyl ether acetate, 3-methyl-3-methoxybutanol, butyl carbitol acetate, methoxybutyl acetate, terpineol, etc.

Conventionally known phosphors can be used as phosphors used in the phosphor layer: examples of a red light emitting phosphor include $Y_2O_3$:Eu, $Y_2O_2S$:Eu, (Y, Gd)$BO_3$:Eu, etc.: examples of a green light emitting phosphor include $BaAl_{12}O_{19}$:Mn, $BaMgAl_{10}O_{17}$:Mn, $BaMgAl_{14}O_{23}$:Mn, $Zn_2SiO_4$:Mn, etc.; examples of a blue light emitting phosphor include $BaMgAl_{10}O_{17}$:Eu, $BaMgAl_{14}O_{23}$:Eu, etc.

The phosphor layer may have any thickness. For instance, in the case where a phosphor layer is provided on a back plate for use in a PDP, the thickness of the layer is conventionally about 20 μm or more. By decreasing the thickness of the phosphor layer to less than 20 μm, it is possible to decrease an amount of use of a phosphor that is expensive.

The phosphor layer of the present invention is suitable for a vacuum ultra-violet radiation excited light emitting element since the phosphor layer has a high luminance. In the case where the phosphor layer of the present invention is used In a vacuum ultra-violet radiation excited light emitting element, it is possible to provide a phosphor layer on both of the front plate and the back plate, but the light emitting element has a higher luminance particularly in the case where the phosphor layer is provided on the back plate of the vacuum ultra-violet radiation excited light emitting element. The phosphor layer of the present invention is suitable particularly for a PDP, among vacuum ultra-violet radiation excited light emitting elements.

EXAMPLES

The following description will depict examples of the present invention in more detail. The present invention, however, is not limited by the examples.

It should be noted that a voidage of a phosphor layer was calculated in the following manner.

Voidage of Phosphor Layer $(vol \%) = (1-(m/(V \times p))) \times 100$ where:
m represents a weight (g) of the phosphor layer;
v represents a volume ($cm^3$) of the phosphor layer; and
p represents a theoretical density ($g/cm^3$) of the phosphor.

Reference Example 100 parts by weight of a powder of a blue light emitting phosphor $BaMgAl_{10}O_{17}$:Eu having a BET specific surface area of 1.2 $m^2/g$ was dispersed in 20 parts by weight of propylene glycol monomethyl ether acetate. A solution obtained by dissolving 3 parts by weight of ethyl cellulose in 13 parts by weight of propylene glycol monomethyl ether acetate was added thereto as a binder solution and mixed, whereby a phosphor paste was prepared. The phosphor paste was applied on glass by screen printing and heated at 450° C., whereby a phosphor layer was produced. The phosphor layer had a voidage of 34 vol % (the phosphor layer had a relative density of 66 vol %). The obtained phosphor layer was placed in a vacuum chamber, maintained in a vacuum of not more than 6.7 Pa ($5 \times 10^{-2}$ torr), and was irradiated with vacuum ultra-violet rays by using EXCIMER 146 nm LAMP (manufactured by Ushio Inc., H0012). As a result, emission of blue light was exhibited. This luminance of the reference example is used as a reference luminance that is assumed to be 100, and data of luminances of the examples and the comparative examples are shown below as luminances relative to the reference luminance.

Example 1

100 parts by weight of a powder of a blue light emitting phosphor $BaMgAl_{10}O_{17}$:Eu having a BET specific surface area of 6 $m^2/g$ was dispersed in 20 parts by weight of propylene glycol monomethyl ether acetate. A solution obtained by dissolving 3 parts by weight of ethyl cellulose in 13 parts by weight of propylene glycol monomethyl ether acetate was added thereto as a binder solution and mixed, whereby a phosphor paste was prepared. The phosphor paste was applied on glass by screen printing and heated at 450° C., whereby a phosphor layer was produced. The phosphor layer had a voidage of 68 vol %. The obtained phosphor layer was placed in a vacuum chamber, maintained in a vacuum of not more than 6.7 Pa ($5 \times 10^{-2}$ torr), and was irradiated with vacuum ultra-violet rays by using EXCIMER 146 nm LAMP (manufactured by Ushio Inc., H0012). As a result, emission of blue light was exhibited. The relative luminance was 112 (with respect to the luminance of the reference example, which is 100).

Example 2

0.0241 g of a powder of a blue light emitting phosphor $BaMgAl_{10}O_{17}$: Eu having a BET specific surface area of 6 $m^2/g$ used in the example 1 was filled in a substrate having a space of 2 cm×1.6 cm×0.02 cm (length×width×depth), whereby a phosphor layer was produced. The phosphor layer had a voidage of 90 vol %. The obtained phosphor layer was placed in a vacuum chamber, maintained in a vacuum of not more than 6.7 Pa ($5 \times 10^{-2}$ torr), and was irradiated with vacuum ultra-violet rays by using EXCIMER 146 nm LAMP (manufactured by Ushio Inc., H0012). As a result, emission of blue light was exhibited. The relative luminance was 138.

Example 3

0.0557 g of a powder of a blue light emitting phosphor $BaMgAl_{10}O_{17}$:Eu having a BET specific surface area of 6 $m^2/g$ used in the example 1 was filled in a substrate having a space of 2 cm×1.6 cm×0.02 cm (length×width×depth), whereby a phosphor layer was produced. The phosphor layer had a voidage of 77 vol %. The obtained phosphor layer was placed in a vacuum chamber, maintained in a vacuum of not more than 6.7 Pa ($5 \times 10^{-2}$ torr), and was irradiated with vacuum ultra-violet rays by using EXCIMER 146 nm LAMP (manufactured by Ushio Inc., H0012). As a result, emission of blue light was exhibited. The relative luminance was 120.

Comparative Example 1

0.103 g of a powder of a blue light emitting phosphor $BaMgAl_{10}O_{17}$:Eu having a BET specific surface area of 6 $m^2/g$ used in the example 1 was filled in a substrate having a space of 2 cm×1.6 cm×0.02 cm (length×width×depth), whereby a phosphor layer was produced. The phosphor layer had a voidage of 58 vol %. The obtained phosphor layer was placed in a vacuum chamber, maintained in a vacuum of not more than 6.7 Pa ($5 \times 10^{-2}$ torr), and was irradiated with vacuum ultra-violet rays by using EXCIMER 146 nm LAMP (manufactured by Ushio Inc., H0012). As a result, emission of blue light was exhibited. The relative luminance was 104.

According to the present invention, it is possible to provide a phosphor layer having a high luminance, a vacuum ultra-violet radiation excited light emitting element in which the foregoing phosphor layer is used, particularly a PDP having a high luminance. Therefore, the present invention has an industrially great advantage.

What is claimed is:

1. A phosphor layer having a voidage of not less than 60 vol% and comprising a phosphor having a BET specific surface area of not less than 3 $m^2/g$.

2. A vacuum ultra-violet radiation excited light emitting element comprising a phosphor layer according to claim 1.

3. The vacuum ultra-violet radiation excited light emitting element according to claim 2, wherein said element is a plasma display panel.

4. The phosphor layer according to claim 1 wherein said phosphor layer has a voidage of not less than 77 vol %.

5. The phosphor layer according to claim 1 wherein said phosphor layer has a voidage of not less than 77 vol % and not more than 95 vol %.

* * * * *